United States Patent
Isomäki et al.

(10) Patent No.: US 6,895,439 B2
(45) Date of Patent: May 17, 2005

(54) AUTHENTICATION AND PROTECTION FOR IP APPLICATION PROTOCOLS BASED ON 3GPP IMS PROCEDURES

(75) Inventors: Markus Isomäki, Espoo (FI); Jose Costa-Requena, Helsinki (FI); Atte Länsisalmi, Espoo (FI); Valtteri Niemi, Helsinki (FI); Aki Niemi, Helsinki (FI); Tao Haukka, Oulu (FI); Gabor Bajko, Budapest (HU); Tommi Viitanen, Tampere (FI)

(73) Assignee: Nokia Corporation, Espoo (FI)

( * ) Notice: Subject to any disclaimer, the term of this patent is extended or adjusted under 35 U.S.C. 154(b) by 205 days.

(21) Appl. No.: 10/401,976

(22) Filed: Mar. 31, 2003

(65) Prior Publication Data

US 2003/0236896 A1 Dec. 25, 2003

Related U.S. Application Data

(63) Continuation-in-part of application No. 10/132,226, filed on Apr. 26, 2002.

(51) Int. Cl.[7] .................. G06F 15/16; G06F 15/173; H04L 9/00
(52) U.S. Cl. .................. 709/229; 709/225; 713/171; 713/201
(58) Field of Search ............................ 709/201, 217, 709/219, 225, 229; 713/151, 155, 159, 168, 171, 185, 201; 380/270; 455/67.1, 410

(56) References Cited

U.S. PATENT DOCUMENTS 5,958,016 A 9/1999 Chang et al.

| | | | |
|---|---|---|---|
| 2002/0147845 A1 | 10/2002 | Sanchez-Herrero et al. | |
| 2002/0151312 A1 | 10/2002 | Bos et al. | |
| 2003/0040280 A1 * | 2/2003 | Koskelainen | 455/67.1 |
| 2003/0100291 A1 * | 5/2003 | Krishnarajah et al. | 455/410 |
| 2003/0152232 A1 * | 8/2003 | Pirila et al. | 380/270 |
| 2003/0159067 A1 * | 8/2003 | Stirbu | 713/201 |

OTHER PUBLICATIONS

3GPP TS 33.203 V1.0.0 (Dec. 2001) Technical Specification, 3rd Generation Partnership Project; Technical Specification Group SA3; Access Security for IP–Based Services (Release 5), pp. 1–37.

RFC 2326 entitled "Real Time Streaming Protocol (RTSP)", Network Working Group, Request for comments: 2326, Categroy: Standards Track, H. Schulzrinne, Columbia U., A. Rao Netscape, R. Lanphler, Real Network, Apr. 1998, pp. 1–78.

* cited by examiner

*Primary Examiner*—Paul H. Kang
(74) *Attorney, Agent, or Firm*—Antonelli, Terry, Stout & Kraus, LLP

(57) ABSTRACT

The present invention is a system and method which provides authentication for data services for at least one UE (12) using common authentication information based upon information stored in a HSS (16) of a home network (20) of the at least one UE for multiple protocols. At least one proxy server (18) stores authentication information for each of the protocols which may be used to provide data services to the at least one UE. Authentication of the protocols available to the least one UE uses the authentication information stored at the at least one proxy server obtained from the protocol used in the home network of the at least one UE.

14 Claims, 1 Drawing Sheet

AUTHENTICATION AND PROTECTION FOR IP APPLICATION PROTOCOLS BASED ON 3GPP IMS PROCEDURES

CROSS-REFERENCE TO RELATED APPLICATION

This application is a Continuation In Part of U.S. patent application Ser. No. 10/132,226, filed Apr. 26, 2002, which application is incorporated herein by reference in its entirety.

BACKGROUND OF THE INVENTION

1. Field of the Invention

The present invention relates to systems and methods for authenticating requests for data services from at least one user equipment using multiple protocols.

2. Description of the Prior Art

The 3GPP Technical Specification TS 33.203 vi.0.0 (2001-12), which is incorporated herein by reference in its entirety, authenticates IP multimedia core network subsystem (IMS) customers by running the Authentication and Key Agreement (AKA) protocol during a SIP register transaction. See Section 6.1 for a discussion of the AKA. After authentication using AKA is completed, the created integrity key (IK) and Cipher Key (CK) are shared between the User Equipment (UE) and the Proxy Call State Control Function (PCSCF) which is the first entity in a SIP network receiving a request for a session from UE. The P-CSCF may be resident in either a home network or a visited network. SIP requests for services are protected by the IK and CK keys until the keys are renewed by another register transaction. The IK and CK keys are securely distributed by any well known technique, such as IP Sec or EPS.

The main SIP entities used for registration of the UE are: UE, P-CSCF, the serving call state control function (S-CSCF) and a home subscriber server (HSS). The UE communicates with the P-CSCF, which communicates with the S-CSCF which communicates with the HSS. A detailed description of authentication and registration is found in Sections 4 and 5–5.2 of the aforementioned specification.

With the advent of IP multimedia services (IM), it is desirable for UE using SIP to have access to data services using additional protocols, such as the Hyper Text Transport. Protocol (HTTP) and the Real-Time Streaming Protocol (HTSP) protocol. A description of the RTSP is found in RFC 2326 dated 1998 which is incorporated herein by reference in its entirety.

Basic to the access of UE to network services involving any protocol, such as SIP, HTTP, and RTSP, is the need for authentication of the UE and security. The state of the art presently is that each protocol utilizes its own security and authentication measures when a request by UE is made for a session of data services. When a UE is a requester of data services involving multiple protocols, individual protocol specific network entities are necessary in the form of a proxy server or otherwise to perform authentication for each protocol. The multiple entities required currently for authentication of UE to obtain sessions involving multiple protocols, which may have different network addresses, involve a duplication of processing by each proxy to obtain the authentication information.

DISCLOSURE OF THE INVENTION

The present invention is a system, method, and at least one proxy server which provides authentication for UE sessions of data services requiring multiple protocols which use common authentication information for each of the multiple protocols. At least one proxy server is used to authenticate requests for sessions of data services from UE for the multiple protocols. While the simplest architecture which may be used to practice the invention is a single proxy server, it should be understood that more than one proxy server may be used to perform authentication for data services for UE for the multiple protocols using the common authentication information.

The at least one proxy server stores authentication information from a subscriber data server of a home network for at least one UE required for a first protocol. The at least one proxy server authenticates requests for sessions of data services received from at least one UE for protocols other than the first protocol by using the authentication information obtained from the subscriber data server for the first protocol. Authentication of sessions involving IMS transactions is readily performed by the at least one proxy server for protocols other than the first protocol.

The at least one proxy server provides access to users of IMS services with a protocol (for example, HTTP) different from SIP (as normally is used in IMS). The IMS services include different data structures (XML, SOAP, ACAP, etc) for performing service management tasks like authorization policy manipulation, member list management, etc. This is necessary for data management requiring a reliable protocol like HTTP while still applying IMS specific security mechanisms. The at least one proxy server authenticates the message according to the IMS specifications and algorithms and passes the content to the correct application server using another protocol different from SIP, like HTTP (for example, Presence, Messaging or a Conferencing Server applications) that implements the service itself.

The at least one proxy server also adds information, preferably in the form of a shared secret key pair or other security mechanism, that the at least one application server, for example, a HTTP or RTSP server, can use to ensure the identity of the user is authenticated that issued the request for services using the particular protocol. The at least one application server has the final responsibility of authorizing the user and/or action to be performed by the application server for the user.

In a preferred embodiment, the first protocol is SIP and the at least one additional protocol is one or both of HTTP and RTSP. Requests for sessions of data services using SIP are transmitted from the P-CSCF resident in the at least one proxy server to a S-CSCF server of the home network and then to the HSS. Requests for sessions of data services using the HTTP protocol use the SIP authentication information and are transmitted from a Hyper Text Transport Protocol (HTTP) proxy of the at least one proxy server to a HTTP server. Requests for sessions of data services using the RTSP protocol use the SIP authentication information and are transmitted from a Real-Time Streaming Protocol (RTSP) proxy of the proxy server to a RTSP server.

The preferred authentication information transmitted from the HSS to the at least one proxy server comprises an integrity key (IK) and a cipher key (CK). The authentication information transmission from the at least one UE to the at least one proxy server also comprises the integrity key (IK) and the cipher key (CK). The keys are processed by the at least one proxy server to determine if the at least one UE is authentic.

The invention eliminates the need for unique authentication information for each protocol to authenticate data sessions for UE. In a preferred embodiment a single proxy server includes all of the proxies for the protocols resident therein. The authentication information for the additional protocols, for example, HTTP and RTSP, is obtained from SIP authentication information of the at least one UE.

The invention is a system including a home network including a subscriber data server which stores at least one user profile regarding providing of data services to at least one user with the profile including authentication information used to authenticate the at least one user of the data services when a request for data services is made using a first protocol; at least one user equipment which requests data services using the first protocol and data services using at least one additional protocol, the at least one user equipment storing authentication information which is used when a request for data services is made to authenticate the at least one user; at least one proxy server including resident therein a first proxy for the first network protocol and at least one additional proxy for the at least one additional protocol; and wherein the first proxy and the at least one additional proxy of the one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); and the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network. The subscriber data server may be a home subscriber server (HSS); the first protocol may be the Session Initiation Protocol (SIP) and a request for data data services using SIP is transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server; and the at least one additional protocol may be the Real-Time Streaming Protocol (RTSP) and a request for data services may be transmitted from a Real-Time Streaming Protocol (RSTP) proxy of the at least one proxy server to a RTSP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from a Real-Time Streaming Protocol (RTSP) proxy of the at least one proxy server to a RTSP server. The authentication information transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys are processed by the at least one proxy server to determine if the at least one user is authentic. The authentication information transmitted from the subscriber data server and the at least one user equipment may be generated using the Authentication and Key Agreement (AKA) protocol.

In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user; at least one proxy server including resident therein a first proxy for the first network protocol and at least one additional proxy for the at least one additional protocol, a method of authentication of the at least one user equipment includes the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); the first protocol may be the Session Initiation Protocol (SIP) and a request for data data services using SIP may be transmitted from a Proxy Call State Control Function (P-CSCF) of the at least one proxy server to a Serving Call State Control Function (S-CSCF) server of the home network; and the at least one additional network protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server; and the at least one additional protocol may be the Real-Time Streaming Protocol (RTSP) and a request for data services may be transmitted from a Real-Time Streaming Protocol (RTSP) proxy of the at least one proxy server to a RTSP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from a Real-Time Streaming Protocol (RTSP) proxy of the at least one proxy server to a RTSP server. The authentication information transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys may be processed by the at least one proxy server to determine if the at least one user is authentic. The authentication information transmitted from the subscriber data server and the at least one user equipment may be generated using the Authentication and Key Agreement (AKA) protocol.

In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server in accordance with the invention includes a first proxy for the first network protocol and at least one additional proxy for the at least one additional protocol which are resident in the at least one proxy server; and wherein the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); and the first protocol may be the Session Initiation Protocol (SIP) and any request for data services using SIP may be transmitted from a Proxy Call State Control Function (P-CSCF) of the at least one proxy server to a Serving Call State Control Function (S-CSCF) server of the home network. The subscriber data server may be a home subscriber server (HSS); and the first protocol may be the Session Initiation Protocol (SIP) and a request for data data services using SIP may be transmitted from a Proxy Call State Control Function (P-CSCF) of the at least one proxy server to a Serving Call State Control Function (S-CSCF) server of the home network; and the at least one additional network protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); and the first protocol may be the Session Initiation Protocol (SIP) and a request for data services using SIP may be transmitted from the at least one proxy server to a Serving Call State Control Function (S-CSCF) server, and the at least one additional protocol may be the Real-Time Streaming Protocol (RTSP) and a request for data services may be transmitted from a Real-Time Streaming Protocol (RSTP) proxy of the at least one proxy server to a RTSP server. The subscriber data server may be a home subscriber server (HSS); and the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network, and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from the at least one proxy server to a RTSP server. The authentication information may be transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys may be processed by the at least one proxy server to determine if the at least one user is authentic. The authentication information transmitted from the subscriber data server and the at least one user equipment may be generated using the Authentication and Key Agreement (AKA) protocol.

A system in accordance with the invention includes a home network including a subscriber data server which stores at least one user profile regarding providing of data services to at least one user with the profile including authentication information used to authenticate the at least one user of the data services when a request for data services is made using a first protocol; at least one user equipment which requests data services using the first network protocol and data services using at least one additional protocol, the at least one user equipment storing authentication information which is used when a request for data services is made to authenticate the at least one user; at least one proxy server, including resident therein a first proxy for the first protocol and at least one additional proxy for the at least one additional protocol; at least one application server coupled to the at least one proxy server, each application server providing data services to the at least one user using at least one of the at least one additional protocols through the at least one proxy server; the first proxy and the at least one additional proxy of the at least one proxy server authenticating requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server and provides information to the at least one application server permitting the at least one application server to provide final authorization of the at least one user to access the at least one application server or to provide final authorization of an action to be performed for the at least one user by the at least one application server. The at least one proxy server may process the authentication information to provide the information to the at least one application server to permit the at least one application server to provide the final authorization including guaranteeing the identity of the at least one user. The processing of the authentication information to provide the information to the at least one application server may comprise a shared secret known to the at least one proxy server and the at least one application server which guarantees the identity of the at least one user at the at least one application server. The shared secret may be a shared key pair which is processed by the at least one application server to verify the identity of the user who is to receive access to the at least one application server or for whom the at least one application server is to take action. The coupling of the at least one proxy server to the at least one application server may be via a secure medium. The at least one application server may register data services with the at least one proxy server which the at least one application server may provide to the at least one user through the at least one proxy server; and the at least one proxy server may store an address of each application server that provides data services for selection by the at least one user which is used to connect the at least one user to the at least one application server to obtain selected data services. The at least one proxy server may be an access point in the system for the transmission of data services between the at least one user and the at least one proxy server.

In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server including resident therein a first proxy for the first network protocol and at least one additional proxy for the at least one additional protocol and at least one application server coupled to the at least one proxy server, each application server providing data services to the at least one user using at least one of the at least one additional protocols through the at least one proxy server, a method of authentication of the at lease one user equipment in accordance with the invention includes the first proxy and the at least one additional proxy of the at least one proxy server authenticating requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server and providing information to the at least one application server permitting the at least one user to provide final authorization of the at least one user to access the at least one application server or to provide final authorization of an action to be performed for the at least one user by the at least one application server. The at least one proxy server may process the authentication information to provide the information to the at least one application server to permit the at least one application server to provide the final authorization including guaranteeing the identity of the at least one user. The processing of the authentication information to provide the information to the at least one application server may comprise a shared secret known to the at least one proxy server and the at least one application server which guarantees the identity of the at least one user at the at least one application server. The shared secret may be a shared key pair which is processed by the at least one application server to verify the identity of the user who is to receive access to the at least one application server or for whom the at least one application server is to take action. The coupling of the at least one proxy server to the at least one application server may be via a secure medium. The at least one application server may register data services with the at least one proxy server which the at least one application server may provide to the at least one user through the at least one proxy server, and the at least one proxy server may store an address of each application server that provides data services for selection by the at least one user which is used to connect the at least one user to the at least one application server to obtain selected data services. The at least one proxy server may be an access point in the system for the transmission of data services between the at least one user and the at least one proxy server.

DETAILED DESCRIPTON OF THE INVENTION

Figure 1:
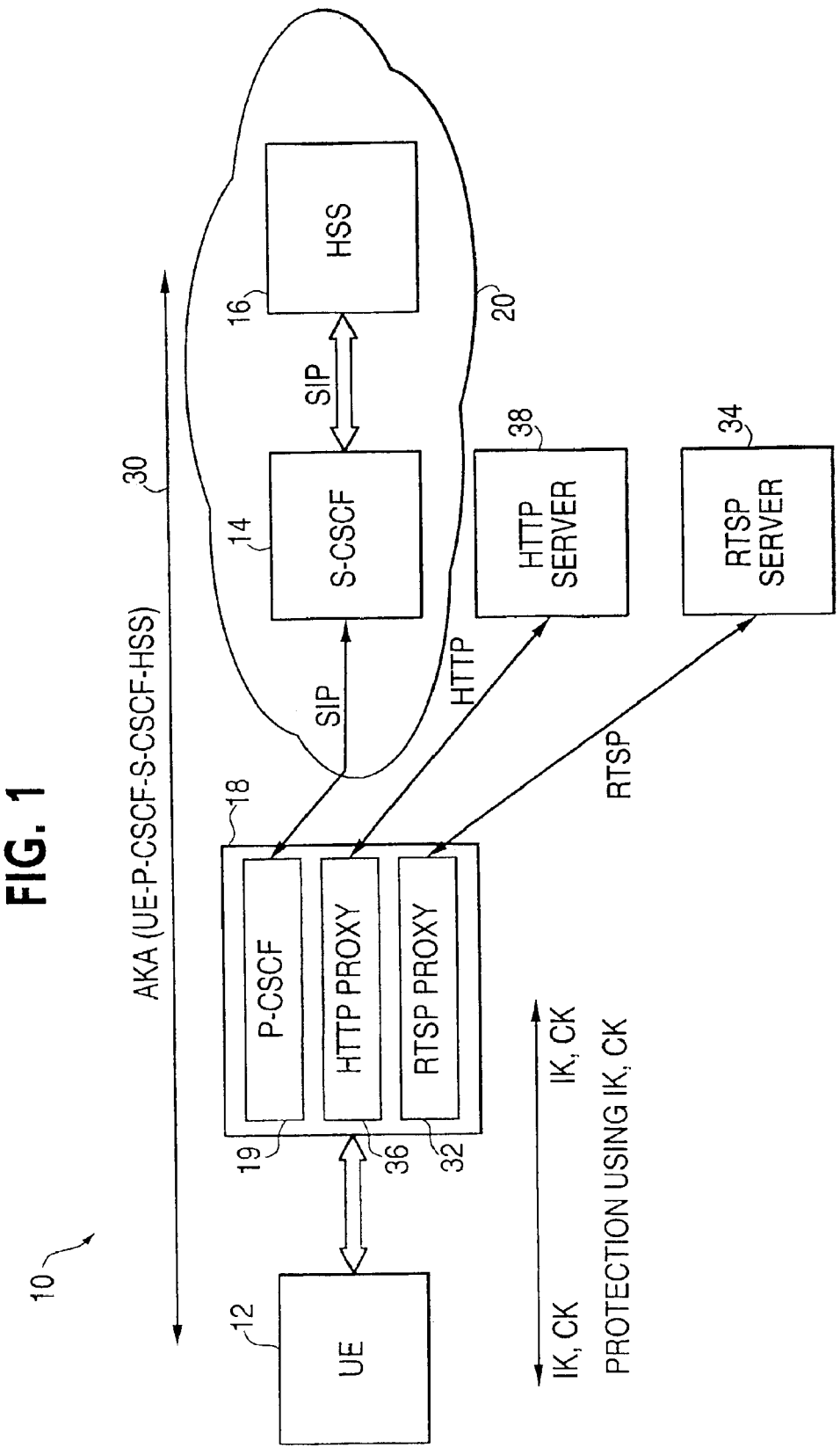
FIG. 1 illustrates a block diagram of a system in accordance with the present invention.

FIG. 1 illustrates a system 10 which includes conventional SIP entities. The entities include at least one UE 12, S-CSCF 14 and HSS 16. At least one proxy server 18 has resident therein the SIP P-CSCF 19, which is contacted by the UE 12, during sessions requesting data services using the SIP protocol. While a single proxy server 18 is illustrated, it should be understood that the invention may be practiced with more than one proxy server 18, including proxies using authentication information transmitted from the subscriber data server to authenticate sessions for multiple protocols. Authentication of the at least one UE 12 for SIP and additional protocols uses the HSS 16 of the home network 20 which stores at least one user profile of the users of the at least one UE regarding providing sessions of data services. It should be understood that use of SIP in the home network 20 as the source of the authentication information for the other protocols is not required in the practice of the invention with the invention being applicable to protocols other than SIP. The at least one user profile stored in the HSS 16 includes authentication information. The same stored authentication information is used to authenticate the at least one UE 12 for a session of data services when a request for data services is made using a first protocol, e.g., without limitation, the SIP protocol and at least one additional protocol.

The at least one UE 12 requests sessions for data services using the first network protocol e.g. SIP and sessions for data services using at least one additional protocol. The at least one UE 12 stores authentication information for the first protocol which is transmitted to the at least one proxy server 18 to authenticate the at least one UE 12 for all of the protocols. The HSS 16, without limitation, may utilize the AKA protocol to provide the authentication information in the form of the IK and CK keys as indicated by arrow 30 from the HSS 16 to the P-CSCF 19 and the UE 12 where the authentication information is stored and from the UE to the P-CSCF as indicated by arrow 40.

The present invention differs from the prior art in that the at least one proxy server 18 includes P-CSCF 19 and RSTP and HTTP proxies 32 and 36 respectively for authenticating the at least one UE 12 to use at least one protocol in addition to the protocol used by the home network, e.g. SIP, e.g. RTSP and HTTP. In a preferred architecture, a single proxy server 18 is used, but the invention is not limited thereto. In a preferred embodiment, the additional proxies are a RTSP proxy 32 and a HTTP proxy 36 all of which are resident in the at least one proxy server 18. The SIP generated authentication information used by the at least one UE 12 for the RTSP proxy 32 and HTTP proxy 36 is the same as that used by the P-CSCF 19.

In accordance with the invention, when the at least one UE 12 requests a session of data services, such as IMS, using any protocol other than protocol of the home network 20, the request is authenticated by using the authentication information provided by the home network, e.g. SIP authentication information IK and CK from the HSS 16. It should be understood that the invention is not limited to the use of the IK and CK authentication information. Therefore, if the at least one UE 12 requests a session of data services using a protocol other than the protocol used by the home network 20, the authentication information obtained from a subscriber data server and specifically, the HSS 16 of the SIP protocol is used for at least one other protocol. Requests for data services for the at least one additional protocol, for example, RTSP and HTTP protocols are authenticated using the authentication information of the home network 20 stored in the subscriber data server of the home network, e.g. HSS 16.

The use of at least one proxy server 18 to provide authentication for at least one UE 12 requesting sessions using multiple protocols by using the authentication information of only one protocol used in the home network 20 saves performing authentication with unique information for each of the protocols as in the prior art. As a result, the prior art requirement of providing distinct authentication information to authenticate each request for a session of data services by the at least one UE 12 for each additional protocol is simplified since authentication of the UE to use the additional protocols requires use of only the authentication information already provided from the HSS 16 of the home network 20 for the first protocol.

A request for a session of data services from the at least one UE 12 is transmitted to the RTSP proxy 32 of the proxy server 18 where the at least one UE 12 is authenticated and thereafter is transmitted to RTSP server 34. Similarly, a request for a session of data services from the at least one UE 12 is transmitted to the HTTP proxy 36 of the proxy server 18 where the at least one UE 12 is authenticated and thereafter is transmitted to the HTTP server 38.

The RTSP and HTTP servers 34 and 38 are connected to the RTSP proxy 32 and the HTTP proxy 36 respectively of the at least one proxy server 18 which connections are preferably secure. The secure connections avoid message integrity problems and man in the middle attacks. The at least one proxy server 18 and specifically, the RTSP proxy 32 and the HTTP proxy 36 store the address of each associated application server which are generically represented by the RTSP server 34 and the HTTP server 38 respectively. The routing may be based on the addressing that may embed hierarchical address information in a URL such as http.www.nokia.com/presence/user1 or adding extra functionality to the at least one proxy server 18 that is based on content or proprietary databases containing the addresses of the applications bound to the proxy server. This may be implemented so that the at least one proxy server 18 acts as an entry point for a group of application servers such as, but not limited to the RTSP and HTTP servers 34 and 38 respectively. The at least one proxy server 18 may process the data packets destined for the at least one application server 34 and 38 to strip off the payload and forward the payload over the aforementioned connections. Examples of application servers represented by the generically identified HTTP server 38 without limitation are Presence, Messaging and Conferencing servers used, for example, to perform service management tasks like authorization policy manipulation and member list management which operate in accordance with the HTTP protocol. Examples of application servers represented by the generically identified RTSP server 34 without limitation are real time audio and video streaming applications.

The at least one proxy server 18 provides information to the at least one application server 34 and 38 permitting the at least one application server to provide final authorization of the at least one user of the UE 12 to access the at least one application server or to provide final authorization of an action to be performed for the at least one user by the at least one application server.

In a IMS application, the application server performs most of the authorization of the user of the UE 12 to obtain access to or have a service performed for the UE. The at least one proxy server 18 authenticates the message according to existing IMS specifications and algorithms and passes the result of the authorization to the at least one additional server 34 and 38. The at least one additional server 34 and 38 has the ultimate knowledge of service specific details which are available therefrom to the user of the UE 12 and the final responsibility of authorizing the user and/or the action to be performed in the specific server. The at least one additional server 34 and 38 has the totality of knowledge of service specific information and other information to process the content received from the at least one proxy 18 over the preferably secure link to authorize the attempted action. The ultimate authorization process performed by the at least one additional server 34 and 38 is preferably based upon secret knowledge exchange which may be without limitation the use of shared key pairs.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A system comprising:

a home network including a subscriber data server which stores at least one user profile regarding providing of data services to at least one user with the profile including authentication information used to authenticate the at least one user of the data services when a request for data services is made using a first protocol;

at least one user equipment which requests data services using the first network protocol and data services using at least one additional protocol, the at least one user equipment storing authentication information which is used when a request for data services is made to authenticate the at least one user;

at least one proxy server, including resident therein a first proxy for the first protocol and at least one additional proxy for the at least one additional protocol;

at least one application server coupled to the at least one proxy server, each application server providing data services to the at least one user using at least one of the at least one additional protocols through the at least one proxy server;

the first proxy and the at least one additional proxy of the at least one proxy server authenticating requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server and provides information to the at least one application server permitting the at least one application server to provide final authorization of the at least one user to access the at least one application server or to provide final authorization of an action to be performed for the at least one user by the at least one application server.

2. A system in accordance with claim 1 wherein:

the at least one proxy server processes the authentication information to provide the information to the at least one application server to permit the at least one application server to provide the final authorization including guaranteeing the identity of the at least one user.

3. A system in accordance with claim 2 wherein:

the processing of the authentication information to provide the information to the at least one application server comprises a shared secret known to the at least one proxy server and to the at least one application server which guarantees the identity of the at least one user at the at least one application server.

4. A system in accordance with claim 3 wherein:

the shared secret is a shared key pair which is processed by the at least one application server to verify the identity of the user who is to receive access to the at least one application server or for whom the at least one application server is to take action.

5. A system in accordance with claim 1 wherein:

coupling of the at least one proxy server to the at least one application server is via a secure medium.

6. A system in accordance with claim 1 wherein:

the at least one application server registers data services with the at least one proxy server which the at least one application server may provide to the at least one user through the at least one proxy server; and the at least one proxy server stores an address of each application server that provides data services for selection by the at least one user which is used to connect the at least one user to the at least one application server to obtain selected data services.

7. A system in accordance with claim 1 wherein:

the at least one proxy server is an access point in the system for the transmission of data services between the at least one user and the at least one proxy server.

8. In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server including resident therein a first proxy for the first network protocol and at least one additional proxy for the at least one additional protocol and at least one application server coupled to the at least one proxy server, each application server providing data services to the at least one user using at least one of the at least one additional protocols through the at least one proxy server, a method of authentication of the at least one user equipment comprising:

the first proxy and the at least one additional proxy of the at least one proxy server authenticating requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server and providing information to the at least one application server permitting the at least one user to provide final authorization of the at least one user to access the at least one application server or to provide final authorization of an action to be performed for the at least one user by the at least one application server.

9. A method in accordance with claim 8 wherein:

the at least one proxy server processes the authentication information to provide the information to the at least one application server to permit the at least one application server to provide the final authorization including guaranteeing the identity of the at least one user.

10. A method in accordance with claim 9 wherein:

the processing of the authentication information to provide the information to the at least one application server comprises a shared secret known the at least one proxy server and the at least one application server which guarantees the identity of the at least one user at the at least one application server.

11. A method in accordance with claim 10 wherein:

the shared secret is a shared key pair which is processed by the at least one application server to verify the identity of the user who is to receive access to the at least one application server or for whom the at least one application server is to take action.

12. A method in accordance with claim 8 wherein:

coupling of the at least one proxy server to the at least one application server is via a secure medium.

13. A method in accordance with claim 8 wherein:

the at least one application server registers data services with the at least one proxy server which the at least one application server may provide to the at least one user through the at least one proxy server; and the at least one proxy server stores an address of each application server that provides data services for selection by the at least one user which is used to connect the at least one user to the at least one application server to obtain selected data services.

14. A method in accordance with claim 8 wherein:

the at least one proxy server is an access point in the system for the transmission of data services between the at least one user and the at least one proxy server.

* * * * *